United States Patent [19]

Woodriff

[11] Patent Number: 5,031,772
[45] Date of Patent: Jul. 16, 1991

[54] COMPUTER DISK HOUSING DEVICE

[76] Inventor: Edward W. Woodriff, 27001 SE. 256th, Ravensdale, Wash. 98051

[21] Appl. No.: 461,677

[22] Filed: Jan. 8, 1990

[51] Int. Cl.$^5$ .............................................. B65D 85/57
[52] U.S. Cl. .................................... 206/444; 206/813; 229/68 R
[58] Field of Search ............... 206/303, 307, 309, 311, 206/312, 313, 425, 444, 813; 229/68 R

[56] References Cited

U.S. PATENT DOCUMENTS

| 2,970,687 | 2/1961 | Johnson | 206/313 |
|---|---|---|---|
| 4,339,034 | 7/1982 | Panveno | 206/313 |
| 4,379,507 | 4/1983 | Llabres | 206/309 |
| 4,453,631 | 6/1984 | Mark | 206/313 |
| 4,473,153 | 9/1984 | Colangelo | 206/444 |
| 4,549,658 | 10/1985 | Sfikas | 206/444 |
| 4,762,225 | 8/1988 | Henkel | 206/444 |
| 4,771,883 | 9/1988 | Herr et al. | 206/313 |
| 4,823,950 | 4/1989 | Roze | 206/444 |
| 4,838,420 | 6/1989 | Collett et al. | 206/387 |

FOREIGN PATENT DOCUMENTS

| 0269159 | 6/1988 | European Pat. Off. | 206/309 |
|---|---|---|---|
| 2620258 | 3/1989 | France | 206/444 |
| 0070982 | 3/1989 | Japan | 206/444 |

Primary Examiner—Jimmy G. Foster
Attorney, Agent, or Firm—Stoel Rives Boley Jones & Grey

[57] ABSTRACT

A housing device for storing and transporting computer disks is provided. The housing device for use with flexible computer disks includes a spacer member disposed between inner faces of the front and rear panels of the housing. The spacer member an outer peripheral surface corresponding generally to edges of the housing device, and an inner peripheral surface corresponding generally to the outer periphery of a flexible disk. This housing device protects the flexible disk from damage resulting from bending and application of pressure, and provides for controlled portability and enhanced storage capabilities. Housing devices of the present invention are also provided with attachment means on the rear panel.

20 Claims, 2 Drawing Sheets

COMPUTER DISK HOUSING DEVICE

TECHNICAL FIELD

The present invention relates generally to devices for safely housing and transporting computer disks to protect the computer disks from damage caused by bending, static electricity and application of pressure. The housing devices of the present invention also provide controlled portability and storage of computer disks, thereby reducing loss or misplacement of the disk and the information stored thereon.

BACKGROUND OF THE INVENTION

As a result of the boom in the personal desktop and lap-top computer industry, considerable business and personal communication is now achieved through the exchange of computer disks. In addition, specialized software products designed for use in personal computers are sold to consumers on such disks. Computer disks are also being distributed in connection with books and other textual materials, such as user's manuals for the software, textbooks dealing with subject matter presented on the disk, and the like. As a practical matter, therefore, housing devices intended for use with computer disks must be portable. Provision of a convenient housing device will contribute to reducing the loss of computer disks during transport from one location to another, thereby achieving controlled portability for the computer disk.

To date, two primary types of computer disks have achieved market acceptability. Most personal computers are designed to use flexible disks which are generally square, each side measuring approximately 5 and ¼ inches. Flexible disks comprise a thin, flexible, plastic covering having several apertures therein surrounding a memory element. Some computers have the ability to use smaller, substantially rigid disks which are generally square, each side measuring approximately 3 and ½ inches. As a result of their construction, the rigid disks are less susceptible to damage than are flexible disks, but flexible disks remain the standard of the industry for many applications.

As a greater quantity of information of higher importance is communicated by means of computer disks, damage to the disks has more severe consequences. This is especially true when hard drive back-up files containing the information stored on the damaged floppy disk either were not made or are not easily accessible. Principal causes of flexible disk damage include bending and application of pressure on the disk covering (i.e., the portion of the disk, typically black in color, which surrounds the disk memory element). When pressure is applied to the disk over a period of time, the memory element of the disk may become bonded to the disk covering, thereby damaging the memory element irreparably. Bending likewise may cause irreparable damage. Thus, there is a need in the art to protect flexible disks from damage resulting from pressure and bending, in a manner which does not reduce, and in fact enhances the portability of computer disks.

Both flexible and rigid computer disks are smaller than standard file folders, notebooks or textbooks. As a result, unintentional separation of the disks from file folders, notebooks, textbooks and the like, resulting in the loss of information stored on such disks, is common. In an effort to combat this problem and to provide convenient storage for computer disks, devices akin to index card holders have been designed specifically for use with flexible or rigid computer disks. These storage devices provide relatively safe storage of disks at a central location, but they do not solve the problem of losses incurred while transporting computer disks. Thus, it would be desirable to provide a housing device which facilitates transport to and storage of computer disks in appropriate locations, absent or with greatly reduced risk of loss of such disks.

SUMMARY OF THE INVENTION

The present invention provides a holder or housing for computer disks which is capable of protecting such disks from damage due to bending, magnetic fields, uniformly applied pressure and, to a lesser extent, from non-uniform or point- or area-specific pressures. The housing device of the present invention additionally enhances portability of computer disks by providing attachment capability, allowing the disks to be removably affixed to and stored in file folders, notebooks, books and the like. The capability of removable attachment to file folders and other objects further provides flexibility in the transport and storage of computer disks.

These benefits are achieved according to the present invention by providing a housing device for computer disks which includes a spacer member disposed within the housing. The spacer member has an outer peripheral surface which corresponds generally to the outer peripheral configuration of the housing to permit the spacer to fit snugly therein. The inner peripheral surface of the spacer member corresponds generally to the outer peripheral configuration of a computer disk, permitting a computer disk to be disposed snugly therein. The spacer member protects the computer disk from damage resulting from bending and the application of pressure, particularly the application of uniformly applied pressure. The rear panel of the housing device preferably has one or more attachment means provided thereon to provide removable attachment of the housing device to a variety of surfaces.

DETAILED DESCRIPTION OF THE INVENTION

Figure 1:
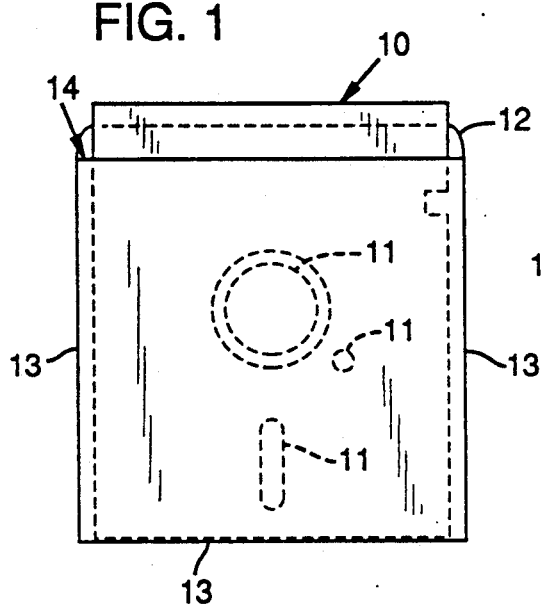
FIG. 1 is a front view of a standard flexible computer disk inserted into a standard disk jacket.

FIG. 1 illustrates a standard, flexible computer disk 10 disposed within a standard disk jacket 12, with the solid lines depicting the portions of the disk 10 and disk jacket 12 exposed to a viewer. Computer disk 10 comprises a memory element substantially covered by a thin, flexible covering. The memory element of computer disk 10 is exposed, however, at several locations, designated 11, due to the pattern of apertures provided in the covering surrounding the memory element. Disk jacket 12 is substantially sealed around three side walls 13, and is provided with opening 14 permitting computer disk 10 to be placed therein. Disk jacket 12 is typically flexible and constructed of a paper or flexible synthetic material. Disk jacket 12 protects the exposed portions of the memory element from direct contact, but it does not protect computer disk 10 from bending forces or the application of pressure.

Figure 2:
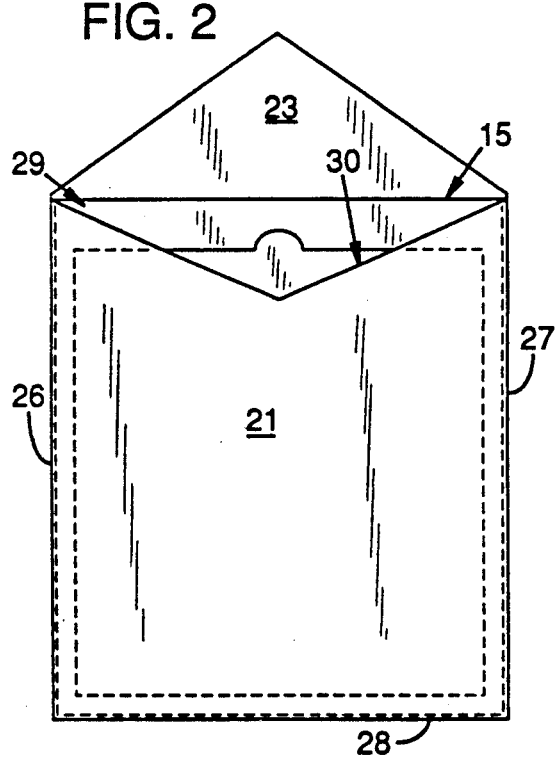
FIG. 2 is a front view of a computer disk housing device of the present invention with the flap portion in an open position and a spacer member shown mounted therein.
Figure 3:
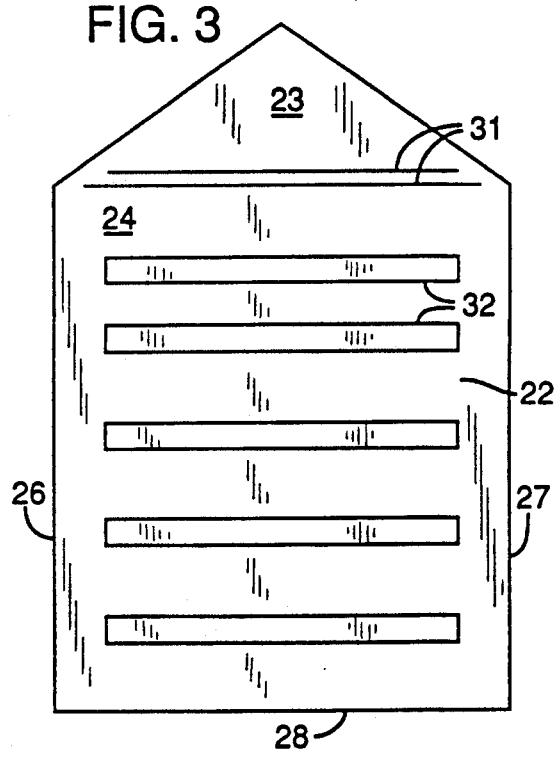
FIG. 3 is a view showing the back panel of the housing device of the present invention with the flap portion in an open position.

FIGS. 2 and 3 show housing device 20 of the present invention which can be used to protect, store and transport computer disks, and is especially suitable for use with flexible computer disks. The solid lines in FIG. 2 indicate the portion of the device visible to a viewer examining the front panel of the housing device. FIG. 3 illustrates the rear panel of the housing device of the present invention.

Front housing panel 21 is affixed to rear housing panel 22 along corresponding edges 26, 27 and 28 and is provided with opening 29 along the uppermost of the side walls comprising the front and rear housing panels, to allow for insertion and removal of a computer disk. Although front and rear housing panels 21 and 22 are described as two separate panels sealed along edges 26, 27 and 28, it will be understood that a variety of panel configurations and constructions may be employed to provide the pocket-like housing device of the present invention. The housing device of the present invention may, for example, be fabricated from a single sheet of material folded and sealed in an envelope like fashion.

Rear housing panel 22 includes an upper flap portion 23 and a lower portion 24. Upper flap portion 23 of rear panel 22 is preferably formed with fold lines 31 at the lowermost portion thereof to facilitate folding of upper flap portion 23 toward front panel 21 to form a closing panel. Although upper flap portion 23 is illustrated as generally triangular, it may have a variety of configurations and sizes, and it is primarily intended to provide closure of the housing device. Attachment means may be provided to secure upper flap portion 23 to front housing panel 21. Front housing panel 21 preferably has a cut-out portion 30 providing access to the interior of the housing device. The cut-out portion likewise is shown as generally triangular, but it may have a variety of configurations and sizes.

Housing panels 21 and 22 must be constructed to form a housing which is capable of supporting a computer disk and/or spacer frame therein. That is, panels 21 and 22 must be affixed to each other along substantially folded or sealed edges such that they do not become detached or damaged during routine use. Additionally, the housing panels must be constructed from a material capable of withstanding such routine use. Both housing panels 21 and 22 may be formed from paper-based products, such as various types and weights of paper, various types and weights of coated paper or cardboard, plastic sheet materials, and the like. According to an especially preferred embodiment of the housing device of the present invention, the interior faces of front and back panels 21 and 22, respectively, have an anti-static coating to reduce accumulation of static electrical charges and protect the computer disk from damage resulting from such accumulations.

Figure 4:
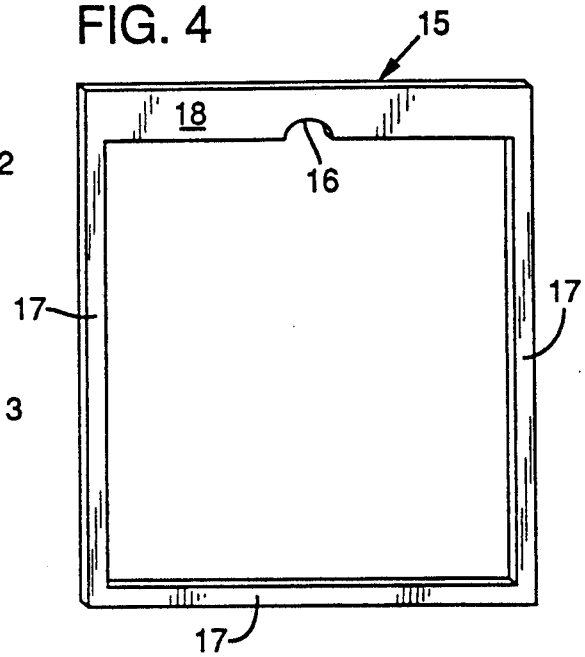
FIG. 4 is a perspective view of the spacer member employed in the present invention.

Housing devices of the present invention intended for use with flexible computer disks include spacer member 15, or a similar support means, disposed between front housing panel 21 and rear housing panel 22. FIG. 4 illustrates one embodiment of spacer member 15, which is formed from a relatively light-weight material capable of withstanding the application of force thereto. Spacer member 15, as shown in FIG. 4, comprises three side walls 17 joined to one another at the corners, and top wall 18. Access groove 16 is preferably provided in top wall 18 to permit insertion of a finger, or a device such as a writing implement, letter opener, key or the like, to aid in removal of the flexible disk disposed within the spacer frame.

According to preferred embodiments, top wall 18 is wider than side walls 17, and most preferably is about twice as wide as side walls 17. The depth of side walls comprising spacer member 15 is preferably substantially constant and is greater than the depth of a standard flexible computer disk. Spacer member 15 mounted in housing device 20 provides support so that a computer disk stored therein is capable of withstanding compressive pressures applied to the face of either housing panel, 21, 22; edges 26, 27 or 28 of side panels; or at the opening of the housing device. Pressure thus applied is applied on the spacer member rather than the computer disk itself.

Spacer member 15 preferably has at least some degree of flexibility and is somewhat resilient. When spacer member 15 is mounted between the front and rear housing panels, the housing device is not entirely rigid, but it permits a limited degree of bending which would not damage a flexible disk stored therein. Spacer member 15 is illustrated as a unitary, frame-like member, but it may alternatively comprise a plurality of discontinuous elements mounted to form a framework in proximity to edges 26, 27, 28 and opening 29 of the front and rear panels. Whether spacer member 15 comprises a unitary member or a plurality of discontinuous elements, the spacer is preferably mounted to the inner face of the front or rear housing panel, most preferably the rear housing panel. Exemplary materials for forming spacer member 15 include cork, semi-rigid and rigid plastics, styrofoam, cardboard, wood, and the like.

As shown in FIG. 3, lower portion 24 of rear housing panel 22 is provided with at least one, and preferably a plurality of attachment means 32 disposed thereon. Attachment means 32 may comprise an adhesive substance, tape, Velcro, or any other convenient means whereby the housing device may be attached to a surface. According to a preferred embodiment, attachment means 32 provide removable attachment of the housing device to a variety of surfaces. Attachment means 32 may be disposed on lower portion 24 of rear housing panel 22 in any convenient manner, and in numerous configurations other than the strip configuration illustrated in FIG. 3. A plurality of attachment means 32 is preferably provided to permit transport and storage of computer disks under a variety of circumstances and provide additional attachment means if some become ineffective as a result of extended use or wear.

In embodiments wherein attachment means 32 are provided as a plurality of adhesive strips, each of the adhesive strips is preferably provided with a cover strip. That is, a cover strip corresponding to the configuration of the adhesive strip and comprising a non-adhesive material is affixed to the adhesive strip to preserve the adhesive for later use and prevent unintended attachment of the housing to various surfaces. The non-adhesive strip material used in this embodiment of the present invention may be any material convenient for this purpose, such as paper, optionally coated with a resin, and the like.

In accordance with this embodiment, one of the cover strips may be removed upon first use of the computer disk housing, thereby exposing adhesive and permitting the housing to be affixed to a file folder, book, or other surface. The housing device having a computer disk positioned therein may later be transferred to different file folders, books, or other locations as desired, provided that the adhesive is capable of successive adhesions. When the first-exposed adhesive is no longer functional, another cover strip may be removed to expose a second adhesive attachment strip. The computer disk housing may then be mounted to additional surfaces as described above by means of a functional, second adhesive strip. Alternatively, more than one adhesive strip may be exposed simultaneously if the nature of the surface to which the computer disk housing is to be affixed requires a larger adhesive surface area to securely mount the housing to the surface.

Figure 5:
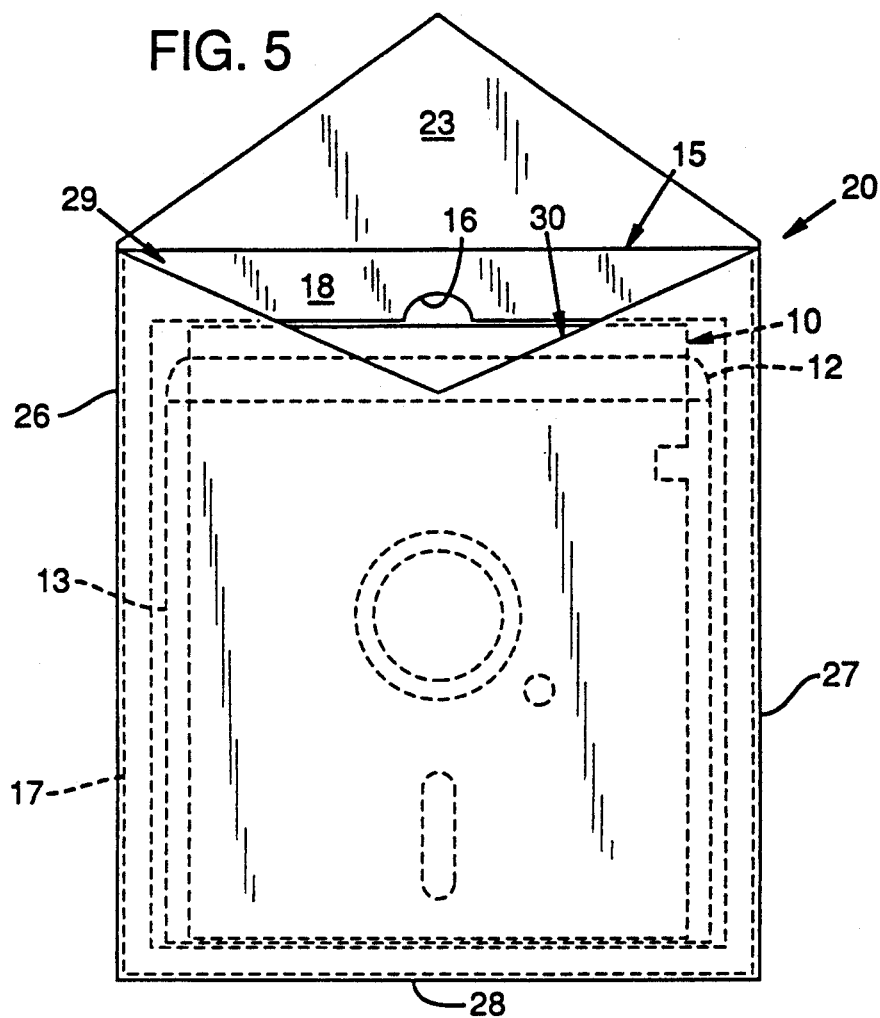
FIG. 5 is a front view of a standard flexible computer disk and jacket disposed within the housing device of the present invention.

FIG. 5 illustrates computer disk housing device 20 of the present invention having a standard flexible computer disk 10 and standard disk jacket 12 disposed therein. Computer disk 10 may optionally be stored in housing device 20 in the absence of disk jacket 12. The peripheral dimensions of disk housing device 20 depend primarily on the dimensions of the computer disk and spacer member 15. The computer disk and disk jacket fit within the inner peripheral surfaces of the spacer member, and the outer peripheral surfaces of the spacer member are adjacent corresponding edges of the front and rear housing panels. The length of the top edge of housing 20 device at opening 29 may be the same or slightly larger than the length of bottom edge 28 to facilitate access to the interior of the housing and removal of computer disks 10 from within housing 20.

Although the housing device of the present invention, as illustrated in FIG. 5, is especially suitable for use with flexible computer disks, similar housing devices may be adapted for use with the smaller, substantially rigid "hard" disks. A housing device suitable for hard computer disks is substantially as described above, including a front housing panel 21 affixed to rear housing panel 22 along the corresponding edges of such panels on all sides except one to allow insertion and removal of a computer disk. The hard disk housing device does not necessarily include spacer member 15, however, since damage to the memory element resulting from bending or application of pressure is a less serious concern. As in the flexible disk housing device illustrated in FIGS. 2, 3 and 5, lower portion 24 of rear housing panel 22 has at least one, and preferably a plurality of attachment means 32 disposed thereon. Attachment means provided on housing devices intended for use with hard disks preferably provide removable attachment of the housing device to a variety of surfaces.

Figure 6:
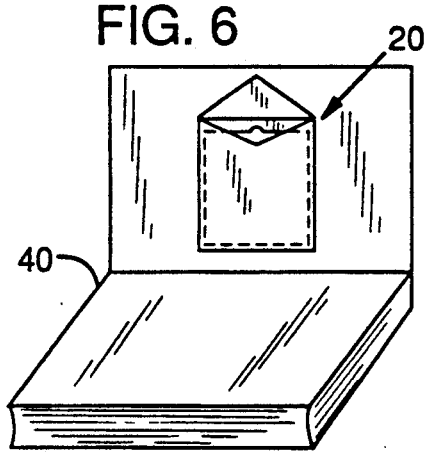
FIG. 6 shows a computer disk housing device of the present invention mounted on an interior panel of a book cover.
Figure 7:
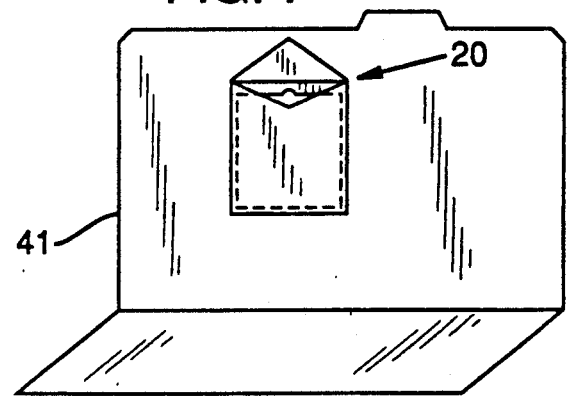
FIG. 7 shows a computer disk housing device of the present invention mounted on an interior panel of a file folder.

Disk housing device 20 containing a computer disk having problems to be solved during the course of class work, may be originally attached to a textbook, such as book 40 shown in FIG. 6. The disk housing may be removed from the textbook and adhered, by means of the same or an additional attachment means, to a folder, such as file folder 41, shown in FIG. 7. The computer disk housing device of the present invention may be transported from one location to another by detaching the housing from its original transport or storage location and mounting the housing to a second storage location or transporting the housing and computer disk to its next destination, where it may be used or stored. Computer disks positioned in housing devices in accordance with the present invention may be transported to and stored in the most appropriate location and affixed to that storage location in a protected fashion. Movement and storage of computer disks in the housing device of the present invention reduces the likelihood that computer disks and information stored thereon will be lost or misplaced.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A housing device for a computer disk comprising:
   a generally rectangular front panel;
   a rear panel having substantially the same configuration and dimensions as said front panel and affixed to said front panel along three edges thereof; and
   a spacer member disposed between inner faces of said front and rear panels and mounted to one of said front and rear panels, said spacer member having an outer peripheral surface corresponding generally to peripheral surfaces of said front and rear panels, and an inner peripheral surface corresponding generally to the outer peripheral surface of a computer disk, thereby permitting said computer disk to be disposed therein and protected from damage resulting from bending and application of pressure.

2. A housing device according to claim 1, wherein said front panel has a cut-out portion along its uppermost edge.

3. A housing device according to claim 1, wherein said rear panel comprises an upper flap portion in addition to a lower portion having substantially the same dimensions and configuration as said front panel.

4. A housing device according to claim 3, wherein the rear panel is provided with fold lines disposed on said upper flap portion in proximity to said lower portion.

5. A housing device according to claim 1, wherein one or more attachment means are mounted to an exterior face of said rear panel.

6. A housing device according to claim 5, wherein said attachment means comprise a plurality of adhesive strips capable of adhering to a plurality of surfaces in succession.

7. A housing device according to claim 6, wherein said adhesive strips have removable covering strips of non-adhesive material mounted thereon.

8. A housing device according to claim 5, wherein said attachment means provide removable attachment of the housing device to a variety of surfaces.

9. A housing device according to claim 1, wherein said spacer member forms a unitary, generally rectangular framework.

10. A housing device according to claim 1, wherein said spacer member forms a discontinuous, generally rectangular framework.

11. A housing device according to claim 1, wherein said spacer member comprises a light-weight, resilient material.

12. A housing device according to claim 11, wherein said resilient material is selected from the group consisting of cork, semi-rigid plastics, styrofoam and cardboard.

13. A housing device according to claim 1, wherein said spacer member comprises three side walls and a top wall, and is provided with an access groove in its top wall.

14. A housing device according to claim 1, wherein said spacer member comprises three side walls and a top wall, and said top wall is wider than said side walls.

15. A housing device according to claim 1, wherein said spacer member has a substantially uniform depth greater than the depth of the computer disk.

16. A housing device according to claim 1 wherein said front and rear panels are provided with an antistatic material to reduce accumulation of static electric charge.

17. A housing device for a computer disk comprising:
a generally rectangular front panel;
a rear panel having substantially the same configuration and dimensions as said front panel and affixed to said front panel along three edges thereof; and
a plurality of adhesive strips mounted to an exterior face of said rear panel, each of said adhesive strips being independently capable of affixing the housing device to a support surface.

18. A housing device according to claim 17, wherein said rear panel comprises an upper flag portion in addition to a lower portion having substantially the same dimensions and configuration as said front panel and affixed to said front panel.

19. A housing device for a computer disk comprising:
a generally rectangular front panel;
a rear panel having substantially the same configuration and dimensions as said front panel and affixed to said front panel along three edges thereof; and
a plurality of adhesive strips capable of adhering to a plurality of surfaces in succession mounted to an exterior face of said rear panel and providing removable attachment of the housing device to a variety of surfaces.

20. A housing of claim 19, wherein said adhesive strips have removable strip of non-adhesive material mounted thereon.

* * * * *